G. J. TATRO.
GRATER.
APPLICATION FILED JUNE 28, 1909.

963,661.

Patented July 5, 1910.

Witnesses

Inventor
George J. Tatro,
By Victor J. Evans.
Attorney

UNITED STATES PATENT OFFICE.

GEORGE JOSEPH TATRO, OF CLEVELAND, OHIO.

GRATER.

963,661. Specification of Letters Patent. Patented July 5, 1910.

Application filed June 28, 1909. Serial No. 504,821.

*To all whom it may concern:*

Be it known that I, GEORGE JOSEPH TATRO, a citizen of the United States, residing at Cleveland, in the county of Cuyahoga and State of Ohio, have invented new and useful Improvements in Graters, of which the following is a specification.

My invention relates to improvements in nutmeg graters, and broadly and generally speaking it comprises a grating member and a holding member rotatably mounted within the grating member.

The principal object of my invention is the provision of a nutmeg grater of the above stated character wherein the carrying element is provided with a nutmeg receiving groove adapted to feed the nutmeg into and hold it in grating position as it is worn away under the grating action, the structure being such that every portion of the nutmeg may be used.

With the above and other objects in view the invention consists in the construction, combination and arrangement of parts hereinafter fully described and claimed, and illustrated in the accompanying drawing, wherein:—

Figure 1:
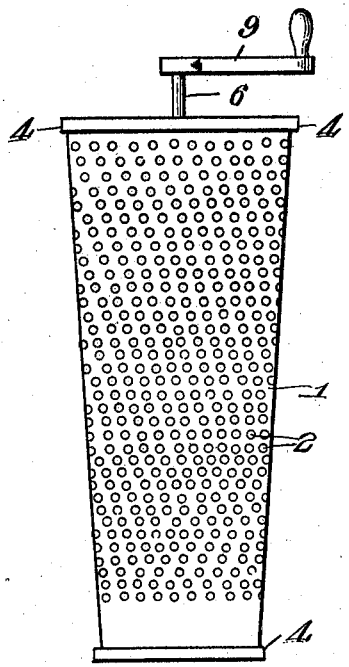
Figure 2:
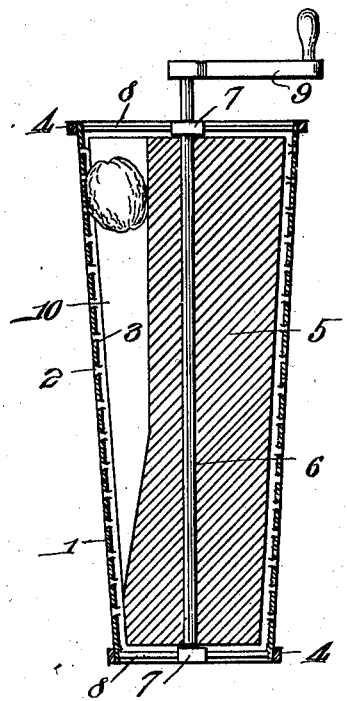
Figure 3:
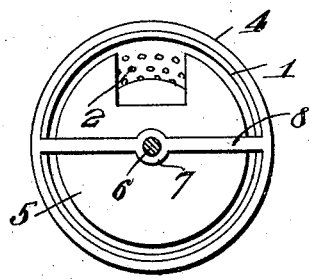

Figure 1 is a view in side elevation of a nutmeg grater constructed in accordance with my invention. Fig. 2 is a sectional view taken on a plane extending vertically and centrally through the nutmeg grater, and Fig. 3 is a top plan view of the nutmeg grater, the crank handle being omitted.

Referring to the drawing by reference numerals, 1 designates a slightly tapered cylindrical grating member which is hollow throughout its entire length, the member preferably tapering inwardly in the direction of its lower end. The grating member 1 is provided with a plurality of openings 2 through which the grated nutmeg is discharged. On its inner side the grating member is provided with a plurality of grating projections 3 which are preferably formed of the material stamped up to provide the openings 2. The ends of the grating member are reinforced by metal bands 4 which are applied to the outer side of the member. The carrying member 5, which is also cylindrical and tapered, and which is smaller in diameter than the grating member 1, is rotatably mounted in the grating member through the medium of a shaft 6. The shaft 6 is journaled in bearings 7 formed in cross bars 8 secured to the grating member 1 adjacent their upper and lower ends. The shaft 6 is provided with a crank handle 9 through the medium of which the holding member may be rotated. The holding member 5 is provided with a longitudinally extending nutmeg receiving groove 10 opening at one side and at its lower end out through the side of the member, the groove opening at its upper end out through the upper end of the member. As the groove 10 opens out through the upper end of the holding member 5 and as the upper end of the grating member 2 is fully open, a nutmeg may be readily and quickly inserted into the groove. After the nutmeg has been inserted into the groove 10, the holding member is rotated through the medium of the crank handle 9, the rotation of the member grating the nutmeg. As the nutmeg is worn away under the grating action it moves downwardly in the groove 10, the downward and outward inclination of the bottom wall of the groove feeding the nutmeg into and holding it in contact with the grating members 3 until it has been entirely worn away.

From the foregoing description, taken in connection with the accompanying drawing, it should be apparent that I provide a nutmeg grater provided with means adapted to hold the nutmeg in grating position until it has been entirely worn away, that the nutmeg grater is simple, durable, and efficient of construction, and that the nutmeg grater may be manufactured and sold at a comparatively low cost.

Changes in the form, proportions and minor details of construction may be made within the scope of the claims, without departing from the spirit or sacrificing any of the advantages of the invention.

Having thus described the invention what I claim as new is:—

1. A nutmeg grater comprising a hollow tapered cylindrical grating member, a tapered cylindrical holding member rotatably mounted within the grating member and provided with a nutmeg receiving groove extending longitudinally thereof, the groove opening at one side and at its lower end out through the side of the holding member and at its upper end out through the upper end of the holding member, the bottom wall of the groove inclining downwardly and outwardly, and means by which the holding member may be rotated within the grating member.

2. A nutmeg grater comprising a hollow tapered cylindrical grating member, said grating member being provided with a plurality of openings and on its inner side with a plurality of grating projections, reinforcing bands secured to the ends of the grating member, cross bars secured to the ends of the grating member, a shaft journaled in the cross bars, a crank handle secured to the upper end of the shaft, and a tapered cylindrical carrying member fixed on the shaft and provided with a nutmeg receiving groove extending longitudinally thereof, said groove opening at one side and at its lower end out through the side of the carrying member and at its upper end out through the upper end of the member, the bottom wall of said groove inclining downwardly and outwardly.

In testimony whereof I affix my signature in presence of two witnesses.

GEORGE JOSEPH TATRO.

Witnesses:
 LOUIS E. ROBERTS,
 MOLLIE ROBERTS.